United States Patent
Ko et al.

(10) Patent No.: US 9,902,817 B2
(45) Date of Patent: Feb. 27, 2018

(54) POLYVINYL CHLORIDE RESIN AND METHOD OF PREPARING THE SAME

(71) Applicant: Hanwha Chemical Corporation, Seoul (KR)

(72) Inventors: Jeong Hwan Ko, Daejeon (KR); Jung Ho Kong, Daejeon (KR); Ji Eun Namgoong, Incheon (KR)

(73) Assignee: Hanwha Chemical Corporation, Seoul (KR)

( * ) Notice: Subject to any disclaimer, the term of this patent is extended or adjusted under 35 U.S.C. 154(b) by 0 days.

(21) Appl. No.: 14/440,221

(22) PCT Filed: Nov. 1, 2013

(86) PCT No.: PCT/KR2013/009854
§ 371 (c)(1),
(2) Date: May 1, 2015

(87) PCT Pub. No.: WO2014/069940
PCT Pub. Date: May 8, 2014

(65) Prior Publication Data
US 2015/0274901 A1    Oct. 1, 2015

(30) Foreign Application Priority Data

Nov. 2, 2012 (KR) .................. 10-2012-0123686

(51) Int. Cl.
*C08F 2/18* (2006.01)
*B32B 5/16* (2006.01)
(Continued)

(52) U.S. Cl.
CPC .... *C08J 3/12* (2013.01); *C08F 2/20* (2013.01); *C08F 2/24* (2013.01); *C08F 2/26* (2013.01);
(Continued)

(58) Field of Classification Search
CPC ............... C08F 2/18; C08F 2/24; C08F 14/06
(Continued)

(56) References Cited

U.S. PATENT DOCUMENTS 3,399,157 A    8/1968   De S Deex et al.
4,150,210 A *  4/1979   Anderson ............... C08F 14/06
                                              524/747
(Continued)

FOREIGN PATENT DOCUMENTS

CN    1982345 A    6/2007
CN    101142240 A  3/2008
(Continued)

OTHER PUBLICATIONS

International Search Report and Written Opinion for Application No. PCT/KR2013/009854 dated Feb. 18, 2014.

*Primary Examiner* — Holly Le
(74) *Attorney, Agent, or Firm* — Lerner, David, Littenberg, Krumholz & Mentlik, LLP

(57) ABSTRACT

Disclosed herein is a polyvinyl chloride resin, including: a first particle group having a particle diameter of 0.01 μm or more and less than 1 μm; and a second particle group having a particle diameter of 1 to 10 μm, wherein the volume ratio of the first particle group to the second particle group is 1:0.4 to 1:1.

4 Claims, 3 Drawing Sheets

(51) Int. Cl.
*C08J 3/12* (2006.01)
*C08F 2/24* (2006.01)
*C08F 114/06* (2006.01)
*C08F 2/20* (2006.01)
*C08F 2/26* (2006.01)

(52) U.S. Cl.
CPC ......... *C08F 114/06* (2013.01); *C08J 2327/06* (2013.01); *Y10T 428/2982* (2015.01)

(58) Field of Classification Search
USPC .................................. 526/344, 88; 428/402
See application file for complete search history.

(56) References Cited

U.S. PATENT DOCUMENTS

| | | | |
|---|---|---|---|
| 4,327,003 A | 4/1982 | Hao et al. | |
| 4,340,722 A * | 7/1982 | Arnal | C08F 6/20 210/651 |
| 4,356,283 A | 10/1982 | Weinlich et al. | |
| 4,501,870 A | 2/1985 | Kidoh et al. | |
| 4,539,380 A | 9/1985 | Cheng et al. | |
| 4,804,728 A | 2/1989 | Kruse et al. | |
| 5,151,476 A * | 9/1992 | Marshall | C08F 14/06 526/344.2 |
| 5,883,191 A * | 3/1999 | Hughes | C08F 265/06 525/71 |
| 6,177,525 B1 * | 1/2001 | McKee | C08F 291/00 524/458 |
| 6,297,316 B1 * | 10/2001 | Espiard | C08F 14/06 524/745 |
| 8,691,927 B2 * | 4/2014 | Shin | C08F 14/06 526/344 |
| 2009/0105431 A1 * | 4/2009 | Bankholt | B01J 8/10 526/88 |
| 2009/0311531 A1 | 12/2009 | Youk et al. | |

FOREIGN PATENT DOCUMENTS

| | | |
|---|---|---|
| CN | 101613429 A | 12/2009 |
| CN | 101955559 A | 1/2011 |
| EP | 1702936 A1 | 9/2006 |
| JP | 55129402 A | 10/1980 |
| JP | S63015805 A | 1/1988 |
| JP | H07165805 A | 6/1995 |
| JP | H10087731 A | 4/1998 |
| JP | 11080479 A | 3/1999 |
| JP | 2000204211 A | 7/2000 |
| JP | 2002348318 A | 12/2002 |
| JP | 2003301083 A | 10/2003 |
| JP | 2011246512 A | 12/2011 |
| KR | 100253685 B1 | 4/2000 |
| KR | 100253686 B1 | 4/2000 |
| KR | 20060062862 A | 6/2006 |
| KR | 100868458 B1 | 11/2008 |
| KR | 20110139326 A | 12/2011 |
| KR | 101154469 B1 | 6/2012 |

* cited by examiner

POLYVINYL CHLORIDE RESIN AND METHOD OF PREPARING THE SAME

CROSS-REFERENCE TO RELATED APPLICATIONS

This application is a national phase entry under 35 U.S.C. § 371 of International Application No. PCT/KR2013/009854, filed Nov. 1, 2013, which claims priority to Korean Patent Application No. 10-2012-0123686, filed Nov. 2, 2012, the disclosures of which are incorporated herein by reference.

TECHNICAL FIELD

The present invention relates to a polyvinyl chloride resin and a method of preparing the same. More particularly, the present invention relates to a polyvinyl chloride resin with a small change in viscosity with time and a method of preparing the same.

BACKGROUND ART

A polyvinyl chloride resin is a kind of general-purpose resin which is used widely in building materials, daily commodities, such as wallpapers, artificial leathers, woven fabrics, sheets, films and the like, and industrial goods.

A polyvinyl chloride resin may be obtained in the form of a microparticle by mixing vinyl chloride monomers, alone or in combination with copolymerizable co-monomers, with an emulsifying agent, a buffering agent, and a polymerization initiator, and subjecting the mixture to microsuspension polymerization, emulsion polymerization, seed polymerization, etc., to prepare a polyvinyl chloride resin latex, and drying the latex.

The polyvinyl chloride resin obtained in this way is transformed into plastisol by the addition of a plasticizer, a stabilizer, a filler and the like, and then can be used for various purposes. Particularly, a vinyl chloride copolymer resin including vinyl chloride acetate as copolymerizable monomers can be used in sealers for automobiles (under body coat, body sealer), tile carpets and adhesive layers for tarpaulin. One of the main quality aspects required for vinyl chloride copolymer resins is viscosity stability at high temperature (30~40° C.). The less the change in viscosity over time, the better the viscosity stability.

Generally, in order to reduce the initial viscosity and change in viscosity with time of a microsuspension-polymerized polyvinyl chloride resin, a process of adding a nonionic emulsifying agent to a polyvinyl chloride resin latex has been used. However, though the nonionic emulsifying agent is somewhat effective at lowering an initial viscosity, the addition of the nonionic emulsifying agent has a limitation in lowering a change in viscosity over time.

Further, seeds are used in emulsion polymerization or microsuspension polymerization to adjust the viscosity of a polyvinyl chloride resin under the control of the particle size thereof. For example, Korean Patent Publication No. 2011-0139326 discloses a method of preparing a polyvinyl chloride resin, in which emulsion polymerization is performed with seeds of two sizes, followed by drying in the presence of a nonionic emulsifying agent. However, this method suffers from the disadvantage of the polymerization process being complicated due to the continuously feeding of monomers, an emulsifying agent and a polymerization initiator during polymerization, requiring a lot of time for the growth of the seeds into large particles, and being high in initial viscosity and change in viscosity with time, compared to a microsuspension polymerization process free of seeds.

DISCLOSURE

Technical Problem

Accordingly, to solve the above-mentioned problems, an object of the present invention is to provide a polyvinyl chloride resin having with a small change in viscosity with time.

Another object of the present invention is to provide a method of preparing the polyvinyl chloride resin.

Technical Solution

In order to accomplish the above objects, an aspect of the present invention provides a polyvinyl chloride resin, including: a first particle group having a particle diameter of 0.01 μm or more and less than 1 μm; and a second particle group having a particle diameter of 1 to 10 μm, wherein the volume ratio of the first particle group to the second particle group is 1:0.4 to 1:1.

Another aspect of the present invention provides a method of preparing a polyvinyl chloride resin, including the steps of microsuspension-polymerizing a mixture of 100 parts by weight of a vinyl chloride monomer, 0.001 to 1.0 parts by weight of a polymerization initiator, 1.0 to 3.0 parts by weight of an emulsifying agent and 0.3 to 1.0 parts by weight of a buffering agent in an aqueous solvent to obtain a polyvinyl chloride resin latex; and spray-drying the polyvinyl chloride resin latex.

Advantageous Effects

According to the polyvinyl chloride resin and preparation method thereof of the present invention, the average particle diameter of the polyvinyl chloride resin increases, and the rate of large-size particles in particle size distribution increases, whereby the plastisol formed of the polyvinyl chloride resin exhibits low viscosity. Further, the change in viscosity of the polyvinyl chloride resin with time decreases, so that the stability thereof can be maintained over time with a consequent improvement in storability.

DESCRIPTION OF DRAWINGS

The above and other objects, features and other advantages of the present invention will be more clearly understood from the following detailed description taken in conjunction with the accompanying drawings, in which.

BEST MODE

Figure 1:
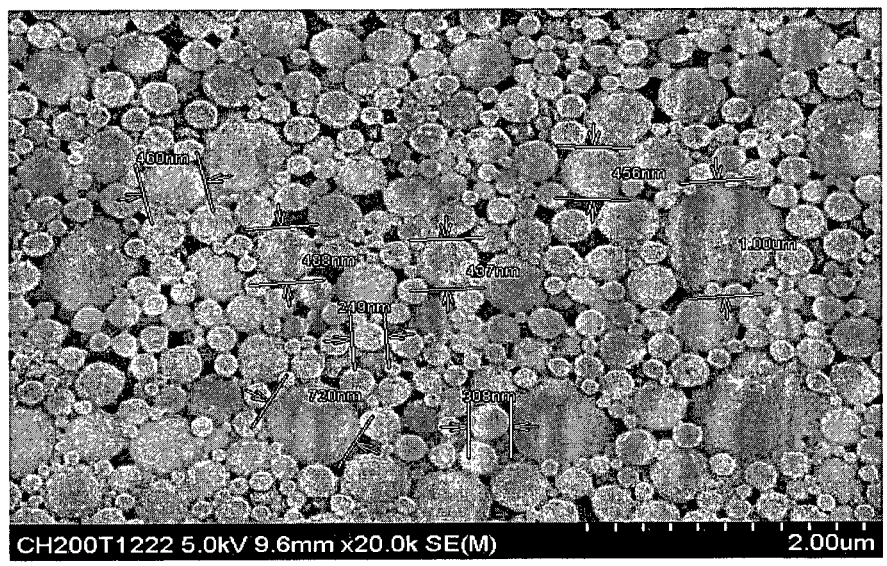
FIG. 1 is an electron microscope photograph of a polyvinyl chloride resin of Example 1 using an electron microscope with a magnifying power of 20,000.

In an aspect of the present invention, the polyvinyl chloride resin includes: a first particle group having a particle diameter of 0.01 µm or more and less than 1 µm; and a second particle group having a particle diameter of 1 to 10 µm, wherein the volume ratio of the first particle group to the second particle group is 1:0.4 to 1:1.

In another aspect of the present invention, the method of preparing a polyvinyl chloride resin includes the steps of: microsuspension-polymerizing a mixture of 100 parts by weight of a vinyl chloride monomer, 0.001 to 1.0 parts by weight of a polymerization initiator, 1.0 to 3.0 parts by weight of an emulsifying agent and 0.3 to 1.0 parts by weight of a buffering agent in an aqueous solvent to obtain a polyvinyl chloride resin latex; and spray-drying the polyvinyl chloride resin latex.

As used herein, the words "first" and "second" are employed only to describe various elements, and intended to discriminate one element from another.

Additionally, the word "on" or "above," as used in the context of formation or construction of one element, means pertaining to the direct formation or construction of one element on another element directly or the additional formation or construction of one element between layers or on a subject or substrate.

The above detailed descriptions of embodiments of the invention are not intended to be exhaustive or to limit the invention to the precise form disclosed above. While specific embodiments of, and examples for the invention are described above for illustrative purposes, various equivalent modifications are possible within the scope of the invention, as those skilled in the relevant art will recognize.

Hereinafter, the polyvinyl chloride resin and preparation method thereof according to an embodiment of the present invention will be described in detail.

The polyvinyl chloride resin of the present invention includes a first particle group having a particle diameter of 0.01 µm or more and less than 1 µm, and a second particle group having a particle diameter of 1 to 10 µm, wherein the volume ratio of the first particle group to the second particle group is 1:0.4 to 1:1.

As used herein, the term "polyvinyl chloride resin" is referred to as "a homopolymer of vinyl chloride monomers" or "a copolymer of vinyl chloride monomers and comonomers copolymerizable therewith".

A polyvinyl chloride resin may be obtained in the form of a microparticle by homogenizing vinyl, chloride monomers, alone or in combination with copolymerizable comonomers, an emulsifying agent, a buffering agent, and a polymerization initiator in an aqueous solvent, microsuspension polymerizing the homogenate into a polyvinyl chloride resin latex, and drying the latex.

According to an embodiment of the present invention, the polyvinyl chloride resin includes a first particle group having a particle diameter of 0.01 µm or more and less than 1 µm, and a second particle group having a particle diameter of 1 to 10 µm, wherein the volume ratio of the first particle group to the second particle group is 1:0.4 to 1:1, and preferably 1:0.4 to 1:0.8.

Given a large proportion of a particle group with a large diameter, the polyvinyl chloride resin allows for a low viscosity of the plastisol formed thereof. Further, the polyvinyl chloride resin having a large proportion of a particle group with a large diameter swells in a delayed manner, so that a change in viscosity with time may be reduced regardless of the contents or polymerization degrees of vinyl chloride monomers. In contrast, when the particle group with a large particle diameter is present too much, the particles may be poor in stability. In this context, therefore, the polyvinyl chloride resin of the present invention has a volume ratio of the first to the second particle group from 1:0.4 to 1:1.

Further, according to an embodiment of the present invention, the average particle diameter of the polyvinyl chloride resin may be approximately 1.2 to 1.5 µm. When the average particle diameter thereof is present in the above range, the polyvinyl chloride resin may have a low viscosity and exhibits a small change in viscosity with time without causing the problem of particle stability.

This polyvinyl chloride resin may be formed into a plastisol by adding a foaming agent, a plasticizer, calcium carbonate and other additives thereto.

According to an embodiment of the present invention, after being stored for 5 days at a temperature of 35° C. and a relative humidity of 65% in a temperature-humidity oven, a plastisol formed from the polyvinyl chloride resin of the present invention is observed to have a viscosity about 5- to about 20-fold, and preferably about 5- to about 15-fold higher than the initial viscosity (measured by a Brookfield viscometer (#7, 20 rpm) after storage at a temperature of 35° C. and a relative humidity of 65% for 1 hr, as measured by a Brookfield viscometer (#7, 20 rpm).

According to another aspect of the present invention, there is provided a method of preparing a polyvinyl chloride resin.

In the method of preparing a polyvinyl chloride resin according to an embodiment of the present invention, first, 100 parts by weight of a vinyl chloride monomer, 0.001 to 1.0 parts by weight of a polymerization initiator, 1.0 to 3.0 parts by weight of an emulsifying agent and 0.3 to 1.0 parts by weight of a buffering agent are mixed, and then microsuspension-polymerized in an aqueous solvent to obtain a polyvinyl chloride resin latex.

The polyvinyl chloride resin may be prepared by polymerizing vinyl chloride monomers, alone or in combination with comonomers copolymerizable therewith.

Examples of the comonomers copolymerizable with the vinyl chloride monomers may include vinyl chloride acetate, alkyl acrylate, alkyl methacrylate, ethylene and propylene. These comonomers may be used independently or in a mixture of two or more thereof.

According to an embodiment of the present invention, the mixture further including 1 to 10 parts by weight of a vinyl chloride acetate comonomer based on 100 parts by weight of the vinyl chloride monomer may be polymerized.

In the method of preparing a polyvinyl chloride resin according to an embodiment of the present invention, the polyvinyl chloride resin may be prepared by microsuspension polymerization.

In the microsuspension polymerization, vinyl chloride monomers or a mixture of vinyl chloride monomers and comonomers copolymerizable with the vinyl chloride monomers, an emulsifying agent, a buffering agent, a polymerization initiator and other additives are mixed in an aqueous solution, and then the mixture is homogenized and polymerized.

As the polymerization initiator, a commercially available polymerization initiator may be used. Examples of the polymerization initiator may include peroxy carbonates, such as diisopropylperoxy dicarbonate, methyl ethyl ketone peroxide, di-2-ethylhexylperoxy dicarbonate, di-3-methoxybutylperoxy dicarbonate, and the like. These polymerization initiators may be used independently or in a mixture of two or more thereof.

The polymerization initiator may be included in an amount of approximately 0.01 to 1.0 parts by weight based on 100 parts by weight of the vinyl chloride monomers. When the content of the polymerization initiator is present in the above range, polymerization reactivity can be suitably exhibited, with an ease in controlling the polymerization heat of reaction.

The emulsifying agent may include an anionic surfactant and a nonionic surfactant.

Examples of the anionic surfactant may include a straight-chain or branched-chain aliphatic acid of 6 to 20 carbon atoms, alkyl sulfonic acid, alkylaryl sulfonic acid, sulfosuccinic acid ester, alkyl sulfate, an alkali metal salt of diphenyl oxide alkyldisulfonate, and an ammonium salt of diphenyl oxide alkyldisulfonate, and the like. These anionic surfactants may be used independently or in a mixture of two or more thereof.

Examples of the nonionic surfactant may include aliphatic alcohols of 12 to 20 carbon atoms and polyethylene glycol alkyl esters. These nonionic surfactants may be used independently or in a mixture of two or more thereof.

The emulsifying agent may be included in an amount of approximately 1.0 to 3.0 parts by weight based on 100 parts by weight of the vinyl chloride monomers. The emulsifying agent serves to maintain stability by uniformly dispersing particles during a microsuspension polymerization process. However, when the emulsifying agent is excessively included, the viscosity of the finally-obtained polyvinyl chloride resin increases, and the particle size thereof decreases, thus increasing the viscosity change rate with time.

According to the method of preparing a polyvinyl chloride resin of the present invention, a suitable amount of the emulsifying agent is used, so that the stability of particles can be maintained during a microsuspension polymerization process, the viscosity of the polyvinyl chloride resin is decreased, and the change in viscosity with time thereof is lowered.

According to an embodiment of the present invention, in the emulsifying agent, the anionic surfactant may be included in an amount of about 0.5 to about 1.5 parts by weight, preferably, about 0.5 to about 1.3 parts by weight based on 100 parts by weight of the vinyl chloride monomers, and the nonionic surfactant may be included in an amount of about 0.5 to about 1.5 parts by weight, preferably, about 0.5 to about 1.0 parts by weight based on 100 parts by weight of the vinyl chloride monomers.

A buffering agent may be mixed in addition to the vinyl chloride monomer, polymerization initiator and emulsifying agent.

Examples of the buffering agent may include sodium carbonate, sodium phosphate, ammonia water, and the like. These buffering agents may be used independently or in a mixture of two or more thereof.

The buffering agent may be used in an amount of approximately 0.3 to 1.0 parts by weight based on 100 parts by weight of the vinyl chloride monomers. According to the method of preparing a polyvinyl chloride resin of the present invention, when the content of the buffering agent is present in the above range, the stability of particles can be maintained during a microsuspension polymerization process even though a small amount of the buffering agent is used.

The mixture of the above-mentioned components may be microsuspension-polymerized in an aqueous solvent to prepare a polyvinyl chloride resin latex. If necessary, the microsuspension polymerization thereof may be performed by selectively adding an additive such as a polymerization degree improver or the like. After the microsuspension polymerization thereof is completed, unreacted monomers, which were not polymerized, may be removed.

The microsuspension polymerization thereof may be performed under the conditions of a polymerization temperature of about 40 to about 60° C., preferably, about 45 to about 58° C. and a polymerization time of about 400 to about 600 minutes, preferably, about 450 to about 550 minutes. In the method of the present invention, since the microsuspension polymerization thereof can be performed at higher temperature than general microsuspension polymerization temperature by about 3 to about 5° C., the polymerization time can be reduced. Further, even when the microsuspension polymerization thereof is performed at high temperature, the degree of polymerization may be not lowered, so that it is advantageous in terms of productivity.

Next, the prepared polyvinyl chloride resin latex is dried to obtain a polyvinyl chloride resin in the form of powder.

According to an embodiment of the present invention, the polyvinyl chloride resin obtained in the above method may include: a first particle group having a particle diameter of 0.01 μm or more and less than 1 μm; and a second particle group having a particle diameter of 1 to 10 μm, wherein the volume ratio of the first particle group to the second particle group is 1:0.4 to 1:1, preferably, 1:0.4 to 1:0.8. Further, the average particle diameter of the polyvinyl chloride resin may be about 1.2 to about 1.5 μm.

The polyvinyl chloride resin obtained in the above method can exhibit a low viscosity and a reduced change in viscosity with time because its average particle diameter increases and the volume of a particle group having a large particle diameter in particle size distribution increases.

Generally, when the content of an emulsifying agent decreases, the stability of particles deteriorates, thus causing abnormal polymerization. However, according to the present invention, such a problem can be solved, and simultaneously the change in viscosity with time thereof can be reduced. Further, polymerization temperature rises, so polymerization time is reduced, thereby improving productivity.

The polyvinyl chloride resin obtained by drying the polyvinyl chloride resin latex may be prepared into a plastisol by the addition of a foaming agent, a plasticizer, calcium carbonate and other additives.

The kind and content of the plasticizer may be suitably selected and adjusted by a method commonly know in the related field.

The foaming agent is not particularly limited, and the kind and content thereof may be suitably adjusted by a method commonly known in the related field.

If necessary, in addition to the plasticizer, foaming agent and calcium carbonate, other additives, for example, a thermal stabilizer, a filler, a surfactant, a viscosity adjuster, a tackifier, a colorant, a diluent, an ultraviolet absorber, an antioxidant, a reinforcing agent, etc., may be added and uniformly mixed, thus preparing a plastisol.

The plastisol prepared in this way can be usefully used in various fields and, particularly, can be easily used for a sealant, because it exhibits low viscosity. Further, the plastisol can maintain low viscosity under the condition of high temperature and high humidity because its change in viscosity with time is small.

MODE FOR INVENTION

Hereinafter, the present invention will be described in more detail with reference to the following Examples. However, these Examples are set forth to illustrate the present invention, and the scope of the present invention is not limited thereto.

EXAMPLES

Example 1

In 54 kg of deionized water were dissolved 0.72 kg of the sodium dodecyl benzene sulfonate (anionic surfactant) and 0.63 kg of cetyl alcohol (nonionic surfactant), both as emulsifying agents, and 0.2 kg of sodium phosphate as a buffering agent. In the resulting solution, 40 g of di-3-methoxybutylperoxy dicarbonate as a polymerization initiator, 20 g of diallyl phthalate as a polymerization degree improver, 50 kg of a vinyl chloride monomer and 3 kg of a vinyl chloride acetate monomer were dispersed for 20 min using a centrifugal pump, and the dispersion was introduced into a 200 L reactor where a polymerization reaction then occurred at 49° C. It took 460 min to complete the polymerization reaction.

After completion of the reaction, a polyvinyl chloride resin latex sample was withdrawn for use in measuring particle diameters, and 5 kg of the polyvinyl chloride resin latex thus obtained was spray-dried to obtain 2 kg of a powdered polyvinyl chloride resin.

Example 2

A polyvinyl chloride resin was obtained in the same manner as in Example 1, except that 0.64 kg of sodium dodecyl benzene sulfonate and 0.56 kg of cetyl alcohol were used. Here, it took 455 min to complete the polymerization reaction.

Example 3

A polyvinyl chloride resin was obtained in the same manner as in Example 1, except that 0.56 kg of sodium dodecyl benzene sulfonate and 0.49 kg of cetyl alcohol were used. Here, it took 465 min to complete the polymerization reaction.

Example 4

A polyvinyl chloride resin was obtained in the same manner as in Example 1, except that 0.48 kg of sodium dodecyl benzene sulfonate and 0.42 kg of cetyl alcohol were used. Here, it took 465 min to complete the polymerization reaction.

Comparative Example 1

In 54 kg of deionized water were dissolved 0.8 kg of the sodium dodecyl benzene sulfonate (anionic surfactant) and 0.7 kg of cetyl alcohol (nonionic surfactant), both as emulsifying agents, and 0.1 kg of sodium phosphate as a buffering agent. In the resulting solution, 70 g of di-3-methoxybutylperoxy dicarbonate as a polymerization initiator, 50 kg of a vinyl chloride monomer and 3 kg of a vinyl chloride acetate monomer were dispersed for 20 min using a centrifugal pump, and the dispersion was introduced into a 200 L reactor where a polymerization reaction then occurred at 46° C. It took 550 min to complete the polymerization reaction.

After completion of the reaction, a polyvinyl chloride resin latex sample was withdrawn for use in measuring particle diameters, and 5 kg of the polyvinyl chloride resin latex thus obtained was spray-dried to obtain 2 kg of a powdered polyvinyl chloride resin.

The contents of the components of Examples 1 to 4 and Comparative Example 1 with respect to 100 parts by weight of vinyl chloride monomers are given in Table 1 below.

TABLE 1

| Class. | Polymerization initiator (unit: part by weight) | Emulsifying agent (unit: part by weight) | | Buffering agent (unit: part by weight) |
| --- | --- | --- | --- | --- |
| | | Anionic surfactant | Nonionic surfactant | |
| Ex. 1 | 0.08 | 1.44 | 1.26 | 0.4 |
| Ex. 2 | 0.08 | 1.28 | 1.12 | 0.4 |
| Ex. 3 | 0.08 | 1.12 | 0.98 | 0.4 |
| Ex. 4 | 0.08 | 0.96 | 0.84 | 0.4 |
| Co. Ex. 1 | 0.14 | 1.6 | 1.4 | 0.2 |

<Test Example>

Observation of Particle Size of Polyvinyl Chloride Resin

Figure 2:
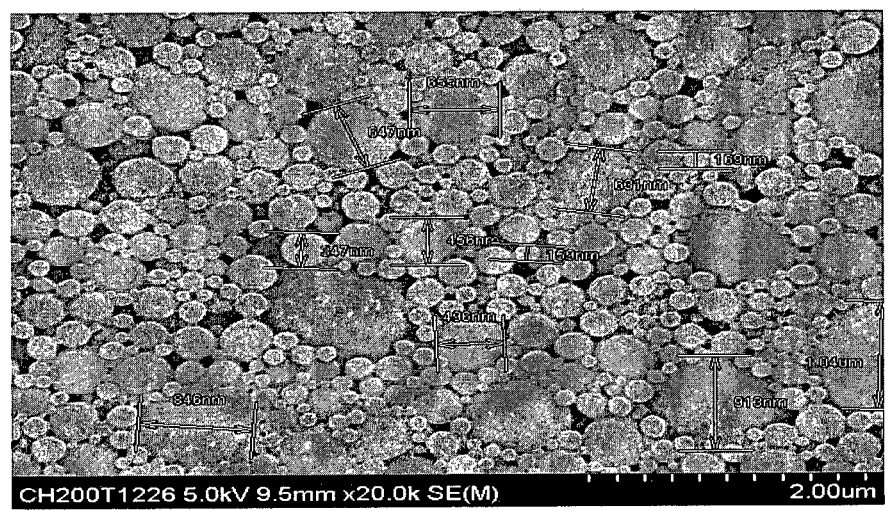
FIG. 2 is an electron microscope photograph of a polyvinyl chloride resin of Example 2 using an electron microscope with a magnifying power of 20,000.
Figure 3:
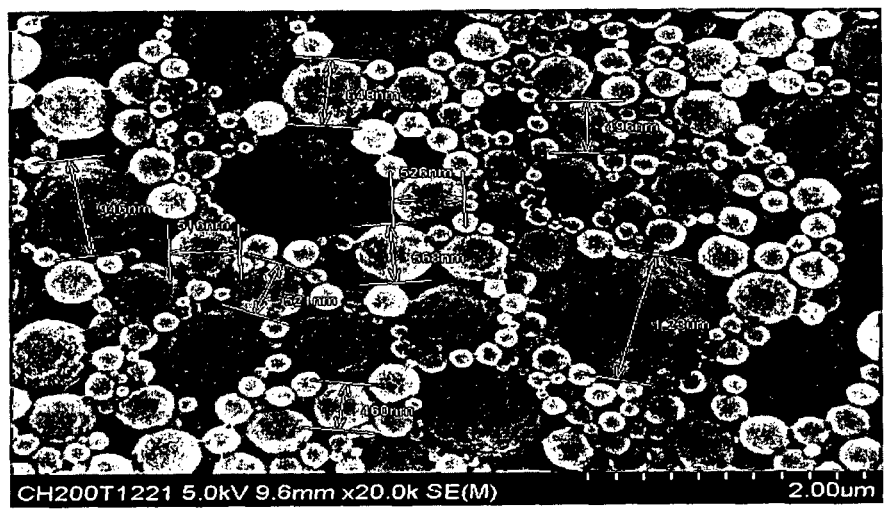
FIG. 3 is an electron microscope photograph of a polyvinyl chloride resin of Example 3 using an electron microscope with a magnifying power of 20,000.
Figure 4:
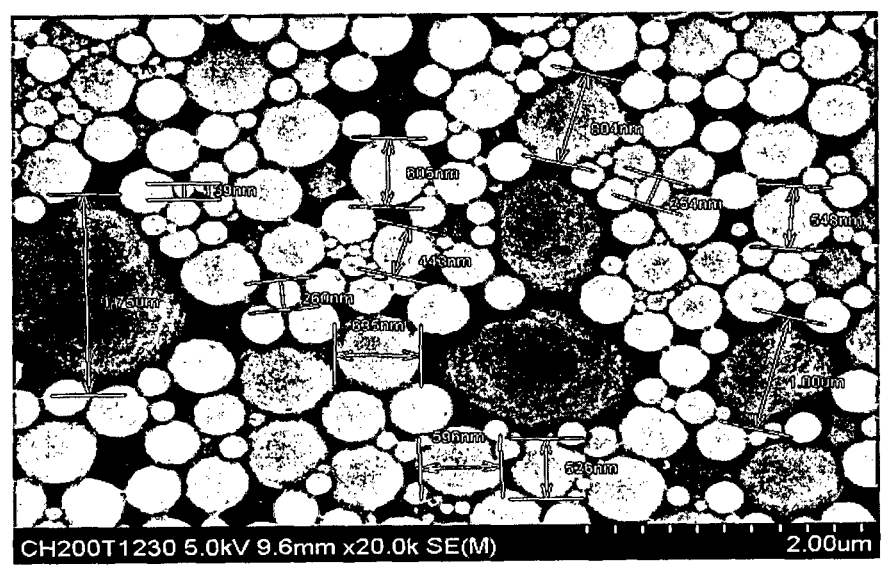
FIG. 4 is an electron microscope photograph of a polyvinyl chloride resin of Example 4 using an electron microscope with a magnifying power of 20,000.
Figure 5:
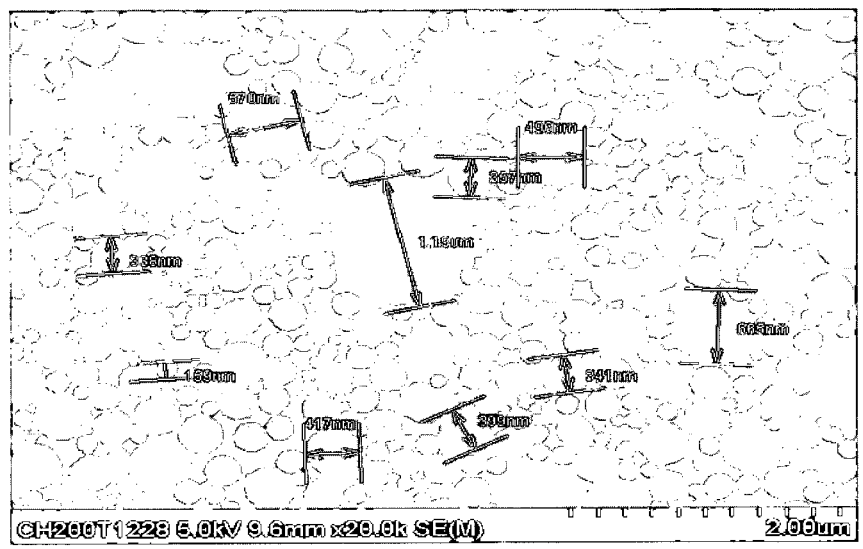
FIG. 5 is an electron microscope photograph of a polyvinyl chloride resin of Comparative Example 1 using an electron microscope with a magnifying power of 20,000.

The polyvinyl chloride resin obtained in Example 1 was observed using a scanning electron microscope with a magnifying power of 20,000, and the result thereof is shown in FIG. 1. Similarly, observation results are shown in FIG. 2 for the polyvinyl chloride resin of Example 2, in FIG. 3 for the polyvinyl chloride resin of Example 3, in FIG. 4 for the polyvinyl chloride resin of Example 4, and in FIG. 5 for the polyvinyl chloride resin of Comparative Example 1.

Measurement of Average Particle Diameter and Particle Size Distribution

Figure 6:
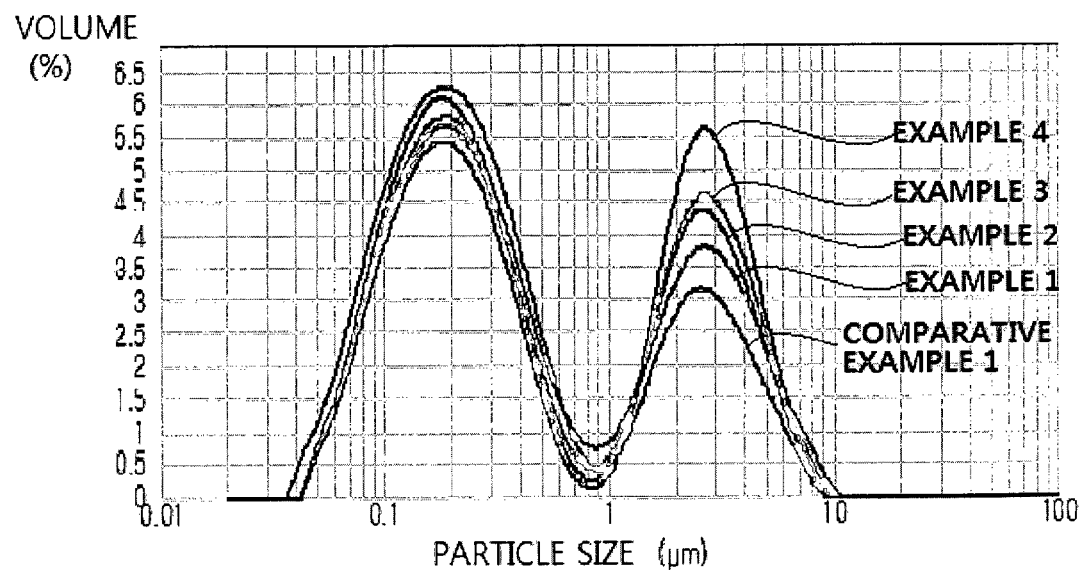
FIG. 6 is graph showing the results of analysis of particle size distributions of polyvinyl chloride resins of Examples 1 to 4 and Comparative Example 1 using Malvern mastersizer.

The average particle diameters and particle size distributions of the polyvinyl chloride resins of Examples 1 to 4 and Comparative Example 1 were measured using a Malvern mastersizer. The measured average particle diameters and volume ratios of a first particle group (particle diameter: 0.01 µm or more and less than 1 µm) to a second particle group (particle diameter: 1 to 10 µm) are given in Table 2 below, and the graph of analysis of the particle size distributions thereof is shown in FIG. 6.

Measurement of Change in Viscosity with Time

Together with 100 parts by weight of each of the powdered polyvinyl chloride resins of Examples 1 to 4 and Comparative Example 1, 70 parts by weight of dioctyl phthalate as a plasticizer and 2 parts by weight of a barium-zinc stabilizer were mixed, followed by kneading the mixture for 10 minutes using a Mathis mixer to prepare a plastisol). The prepared plastisol was stored in a temperature-humidity oven of a temperature of 35° C. and a humidity of 65%. After 1 hour, the viscosity of the plastisol was measured and then again post-storage 5 days using a Brookfield viscometer (spindle No. 7).

The measured viscosity and change in viscosity thereof are given in Table 2 below. The change in viscosity was calculated by the ratio of viscosity after 5 days to viscosity after 1 hour.

TABLE 2

| Class. | Avg. particle diameter (unit: μm) | Volume ratio of 1st to 2nd particle group | Viscosity After 1 hr (unit: cps) | Viscosity After 5 days (unit: cps) | Change in viscosity (unit: ratio) |
| --- | --- | --- | --- | --- | --- |
| Ex. 1 | 1.237 | 1:0.49 | 3,860 | 64,400 | 16.68 |
| Ex. 2 | 1.261 | 1:0.51 | 3,020 | 47,200 | 15.63 |
| Ex. 3 | 1.346 | 1:0.56 | 2,960 | 39,000 | 13.18 |
| Ex. 4 | 1.436 | 1:0.72 | 2,020 | 11,400 | 5.64 |
| C. Ex. 1 | 0.987 | 1:0.35 | 3,760 | 89,200 | 23.72 |

Referring to Table 2 above, it can be ascertained that the viscosity change rate of each of the plastisols of Examples 1 to 4 is remarkably low compared to that of the plastisol of Comparative Example 1. Further, in Examples 1 to 4, it can be seen that the change in viscosity with time thereof becomes lower as the content of an emulsifying agent (anionic surfactant and nonionic surfactant) decreases.

Referring to FIGS. 1 to 6, it can be ascertained that the average particle diameter and large particle rate of the polyvinyl chloride resin increase as the content of an emulsifying agent decreases. Further, it can be ascertained that the change in viscosity with time thereof is lowered according to the reduction in swelling speed due to a plasticizer.

Generally, when the content of an emulsifying agent decreases, the stability of particles deteriorates, thus causing abnormal polymerization. However, according to the present invention, such a problem can be solved, and simultaneously, change in viscosity with time can be reduced.

Further, it can be ascertained that the polymerization time of Examples 1 to 4 was reduced by 15% or more compared to that of Comparative Example 1 as the polymerization temperature increases from 46° C. to 49° C. Therefore, the method of preparing a polyvinyl chloride resin according to the present invention can prepare a polyvinyl chloride resin having a small change in viscosity with time and is advantageous in terms of productivity.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A method of preparing a polyvinyl chloride resin, comprising the steps of:
    microsuspension-polymerizing a mixture of 100 parts by weight of a vinyl chloride monomer, 1 to 10 parts by weight of a vinyl chloride acetate monomer, 0.001 to 1.0 parts by weight of a polymerization initiator, 0.5 to 1.5 parts by weight of an anionic surfactant, 0.5 to 1.5 parts by weight of a nonionic surfactant, and 0.3 to 1.0 parts by weight of a buffering agent in an aqueous solvent to obtain a polyvinyl chloride resin latex; and
    spray-drying the polyvinyl chloride resin latex,
    wherein the polyvinyl chloride resin comprises a first particle group having a particle diameter of 0.01 μm to less than 1 μm, and a second particle group having a particle diameter of 1 to 10 μm, wherein the volume ratio of the first particle group to the second particle group is 1:0.4 to 1:1.

2. The method of claim 1, wherein the anionic surfactant includes sodium dodecyl benzene sulfonate.

3. The method of claim 1, wherein the nonionic surfactant includes cetyl alcohol.

4. The method of claim 1, wherein the polyvinyl chloride resin has an average particle diameter of 1.2 to 1.5 μm.

* * * * *